(12) United States Patent
Goldfish et al.

(10) Patent No.: US 12,609,790 B2
(45) Date of Patent: Apr. 21, 2026

(54) APPARATUS, SYSTEM AND METHOD OF CONFIGURING A BLUETOOTH LINK FOR COMMUNICATION WITH A HUMAN INTERFACE DEVICE (HID)

(71) Applicant: INTEL CORPORATION, Santa Clara, CA (US)

(72) Inventors: Nir Goldfish, Petah Tikva (IL); Sunil Kumar, Cupertino, CA (US); Nir Balaban, Kfar Netter (IL); Oren Haggai, Kefar Sava (IL); Hakan Magnus Eriksson, Portland, OR (US); Prasanna Desai, Elfin Forest, CA (US); Srinivas Krovvidi, Telengana (IN)

(73) Assignee: INTEL CORPORATION, Santa Clara, CA (US)

( * ) Notice: Subject to any disclaimer, the term of this patent is extended or adjusted under 35 U.S.C. 154(b) by 943 days.

(21) Appl. No.: 17/561,552

(22) Filed: Dec. 23, 2021

(65) Prior Publication Data

US 2023/0208574 A1     Jun. 29, 2023

(51) Int. Cl.

| | |
|---|---|
| *H04W 4/80* | (2018.01) |
| *H04L 5/00* | (2006.01) |
| *H04W 48/16* | (2009.01) |
| *H04W 72/0446* | (2023.01) |
| *H04W 72/0453* | (2023.01) |

(52) U.S. Cl.
CPC .......... *H04L 5/0005* (2013.01); *H04L 5/0048* (2013.01); *H04W 4/80* (2018.02); *H04W 48/16* (2013.01); *H04W 72/0446* (2013.01); *H04W 72/0453* (2013.01)

(58) Field of Classification Search
CPC ...... H04L 5/0005; H04L 5/0048; H04W 4/80; H04W 48/16; H04W 72/0446; H04W 72/0453; H04W 12/50; H04W 84/18; H04W 72/51; G06F 21/83
See application file for complete search history.

(56) References Cited

U.S. PATENT DOCUMENTS

| | | | |
|---|---|---|---|
| 9,763,244 B1 * | 9/2017 | Jorgovanovic | ...... H04W 28/065 |
| 10,700,765 B1 * | 6/2020 | Syed | ....................... G06F 21/83 |

(Continued)

OTHER PUBLICATIONS

J. Misic, V. B. Misic and E. W. S. Ko, "Fixed cycles and adaptive bandwidth allocation can coexist in bluetooth," in Canadian Journal of Electrical and Computer Engineering, vol. 29, No. 1/2, pp. 135-147, Jan.-Apr. 2004, doi: 10.1109/CJECE.2004.1425807. (Year: 2004).*

(Continued)

*Primary Examiner* — Thinh D Tran
(74) *Attorney, Agent, or Firm* — Shichrur & Co.

(57) ABSTRACT

For example, a first Bluetooth (BT) device, which may be capable of configuring a BT link for communication between the BT device and a Human Interface Device (HID). For example, the BT device maty include logic and circuitry configured to identify an HID type of the HID. For example, the BT device may configure a slot allocation setting of the BT link between the BT device and the HID, for example, based on the identified HID type of the HID. In one example, the HID type may include a mouse, or a keyboard. In other aspects, any other additional or alternative HID type may be used.

24 Claims, 3 Drawing Sheets

(56) References Cited

U.S. PATENT DOCUMENTS

| | | | |
|---|---|---|---|
| 2008/0175207 A1* | 7/2008 | Lee | H04L 65/61 |
| | | | 370/337 |
| 2011/0097997 A1* | 4/2011 | Huang | H04W 72/1263 |
| | | | 455/41.2 |
| 2013/0260686 A1* | 10/2013 | Mukherjee | H04W 72/0446 |
| | | | 455/41.2 |
| 2015/0133185 A1* | 5/2015 | Chen | H04W 72/1215 |
| | | | 455/552.1 |
| 2017/0039151 A1* | 2/2017 | Christopher | G06F 13/4282 |
| 2022/0109617 A1* | 4/2022 | Lim | H04L 43/0852 |

OTHER PUBLICATIONS

Bluetooth Core Specification V 5.0, Dec. 6, 2016, 2822 pages.

* cited by examiner

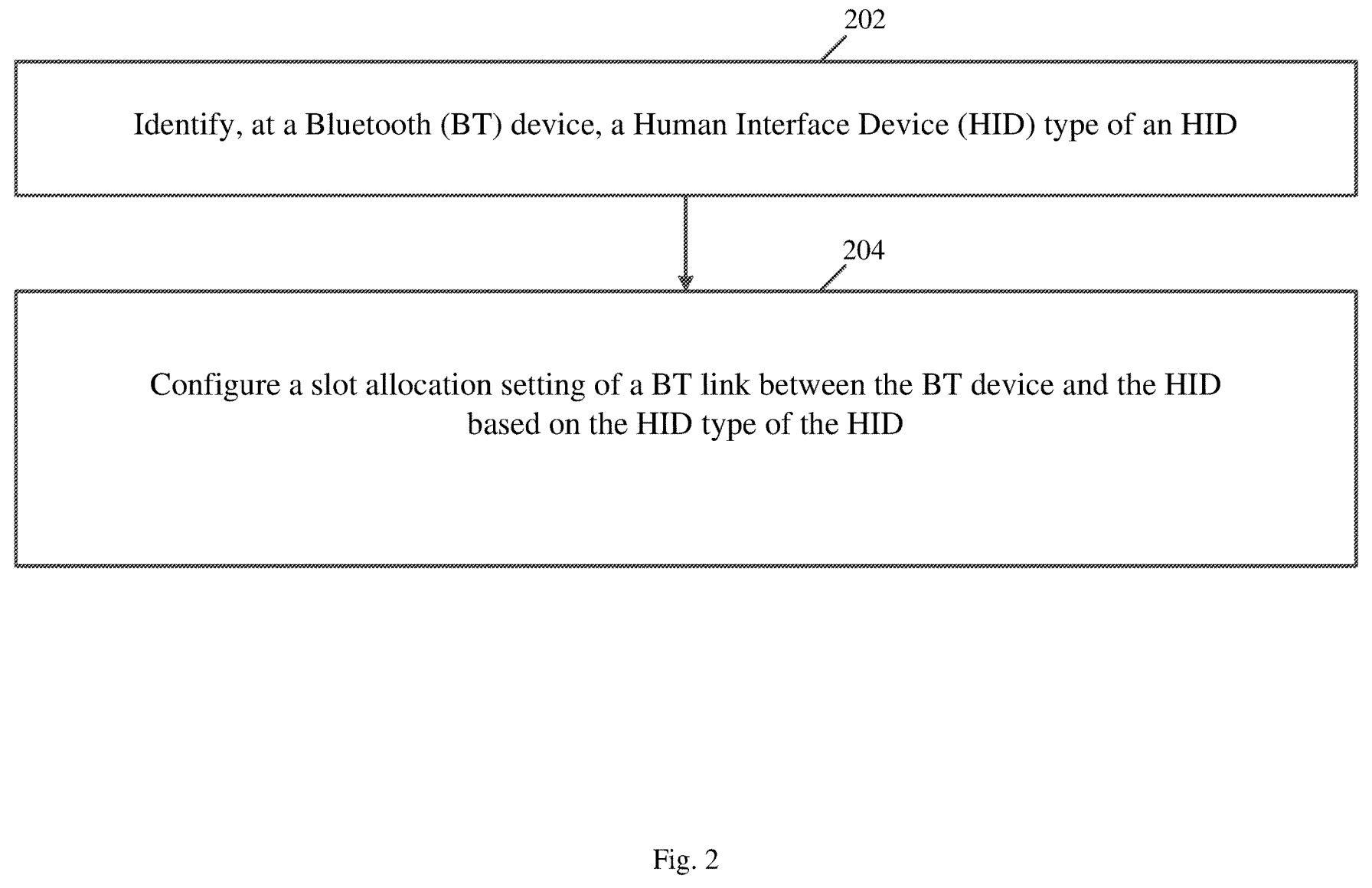

202

Identify, at a Bluetooth (BT) device, a Human Interface Device (HID) type of an HID

204

Configure a slot allocation setting of a BT link between the BT device and the HID based on the HID type of the HID

Fig. 2

APPARATUS, SYSTEM AND METHOD OF CONFIGURING A BLUETOOTH LINK FOR COMMUNICATION WITH A HUMAN INTERFACE DEVICE (HID)

TECHNICAL FIELD

Aspects described herein generally relate to configuring a Bluetooth link for communication with a Human Interface Device (HID).

BACKGROUND

A first Bluetooth device may be connected to and/or paired with a second Bluetooth device, for example, to transfer data between the first and second Bluetooth devices.

When setting up a Bluetooth link between two Bluetooth devices, there may be a need to configure one or more attributes for communication over the Bluetooth link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic flow-chart illustration of a method of configuring a Bluetooth link for communication with a Human Interface Device (HID), in accordance with some demonstrative aspects.

DETAILED DESCRIPTION

Figure 1:
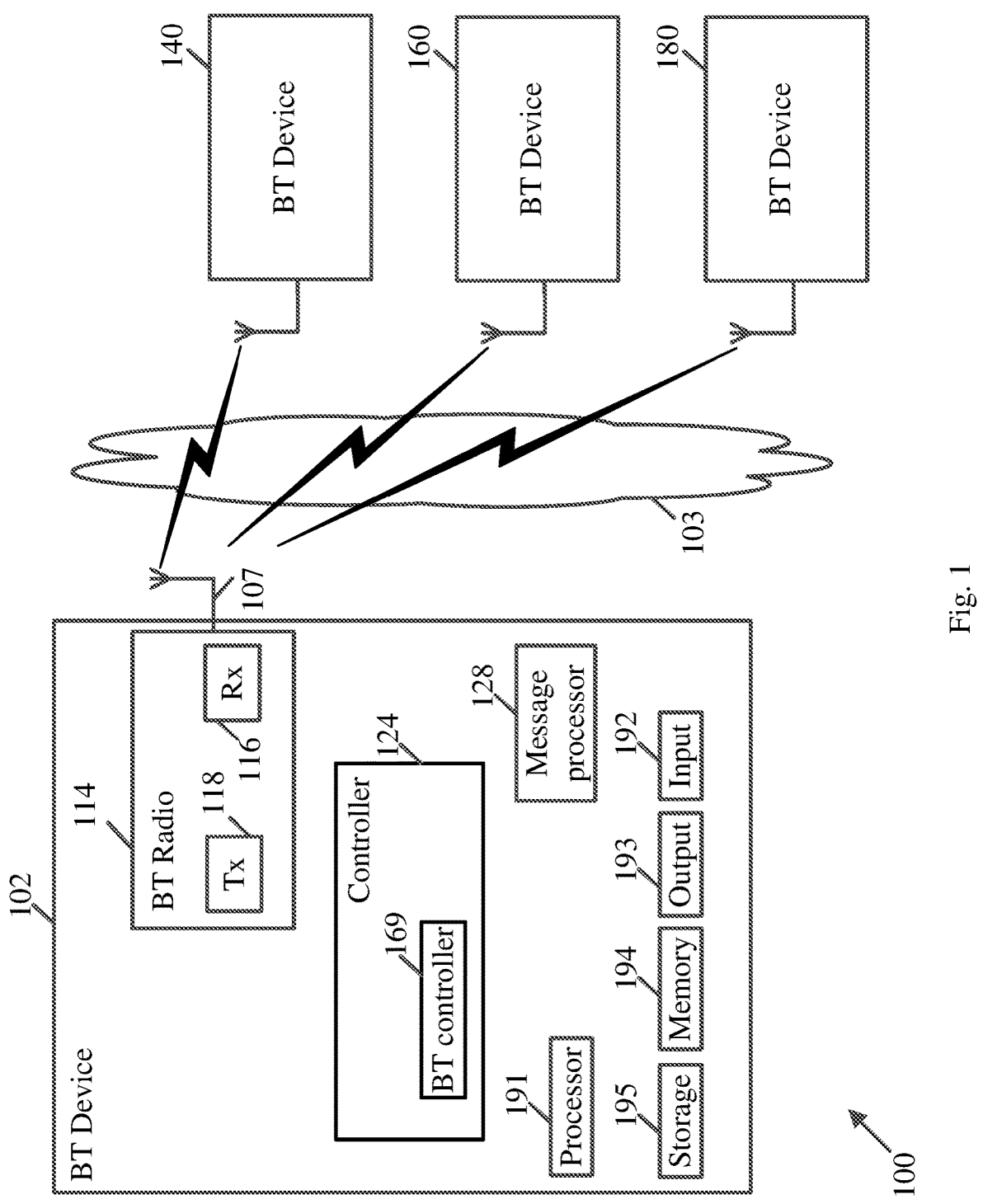
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Bluetooth (BT) device, a Bluetooth Low Energy (BLE) device, an audio device, a video device, an audio (A/V) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2020 (IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December, 2020)) and/or future versions and/or derivatives thereof, devices and/or networks operating in accordance with existing cellular specifications and/or protocols, units and/or devices which are part of the above networks, and the like.

Some aspects may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, 5 GHz, or 6 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to BT communication, e.g., according to a BT protocol and/or a BLE protocol. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., including wireless communication devices 102, 140, 160 and/or 180.

In some demonstrative aspects, devices 102, 140, 160 and/or 180 may include, operate as, and/or perform the functionality of one or more BT devices.

In some demonstrative aspects, devices 102, 140, 160 and/or 180 may include a BT mobile device. In other aspects, devices 102, 140, 160 and/or 180 may include may include a non-mobile BT device.

In one example, devices 102, 140, 160 and/or 180 may include BT Low Energy (LE) (BLE) compatible devices. In other aspects, devices 102, 140, 160 and/or 180 may include or implement any other additional or alternative BT communication functionality, e.g., according to any other additional or alternative BT protocol.

In some demonstrative aspects, device 102 may include, for example, a UE, an MD, a STA, a PC, a desktop computer, a mobile computer, a laptop computer, a Smartphone, a mobile phone, a cellular telephone, an Ultrabook™ computer, a notebook computer, a tablet computer, a server computer, a handheld computer, a handheld device, a wearable device, an on-board device, an off-board device, a hybrid device, a consumer device, a vehicular device, a non-vehicular device, a mobile or portable device, a non-mobile or non-portable device, a video device, an audio device, an A/V device, a media player, a television, a music player, or the like.

In some demonstrative aspects, devices 140 and/or 160 may include, for example, a Human Interface Device (HID).

In some demonstrative aspects, device 140 may include an HID of a first HID type, and/or device 160 may include an HID of a second type, e.g., different from the first HID type.

In one example, device 140 may include a keyboard device, and/or device 160 may include a mouse device.

In another example, device 140 may include a mouse device of a first type, e.g., having one or more first BT functionalities, and/or device 160 may include a mouse device of a second type, e.g., having one or more second BT functionalities.

In some demonstrative aspects, device 140 and device 160 may include HID devices of a same HID type. For example, device 140 may include a first keyboard device, and/or device 160 may include a second keyboard device.

In other aspects, device 140 and/or device 160 may include any other suitable type of HID apparatus, device, module and/or unit.

In some demonstrative aspects, device 180 may include, operate as, and/or perform the functionality of another BT device.

For example, device 180 may include, operate as, and/or perform the functionality of a BT audio device. For example, the BT audio device may include a BT headset, a BT headphone, a BT earphone, a BT hands-free device, a voice-controlled device, a smart speaker device, a sensor device, a BT A/V device, a device incorporating a BT audio device, and/or any other audio device, which may be configured to communicate audio traffic with BT device 102.

In some demonstrative aspects, devices 102, 140, 160 and/or 180 may include, operate as, and/or perform the functionality of one or more STAs. For example, device 102 may include at least one STA, and/or device 140 may include at least one STA.

In some demonstrative aspects, devices 102, 140, 160 and/or 180 may include, operate as, and/or perform the functionality of one or more WLAN STAs.

In some demonstrative aspects, devices 102, 140, 160 and/or 180 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In other aspects, devices 102, 140, 160 and/or 180 may include, operate as, and/or perform the functionality of any other type of STA and/or device.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, or other suitable removable or non-removable storage units. Memory unit 194 and/or storage unit 195, for example, may store data processed by device 102.

In some demonstrative aspects, wireless communication devices 102, 140, 160 and/or 180 may be capable of communicating content, data, information and/or signals via a wireless medium (WM) 103.

In some demonstrative aspects, wireless medium 103 may include, for example, a BT channel, a radio channel, a cellular channel, a Global Navigation Satellite System (GNSS) Channel, an RF channel, a WiFi channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative aspects, devices 102, 140, 160 and/or 180 may include one or more BT radios including circuitry and/or logic to perform wireless communication between devices 102, 140, 160, 180 and/or one or more other BT devices. For example, device 102 may include at least one BT radio 114.

In some demonstrative aspects, devices 102, 140, 160 and/or 180 may include one or more other radios, e.g., a WiFi radio, an OFDM radio, a cellular radio, and/or the like.

In some demonstrative aspects, BT radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, BT radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, BT radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, BT radio 114 may be configured to communicate over a 2.4 GHz band, and/or any other band.

In some demonstrative aspects, BT radio 114 may include, or may be associated with, one or more antennas. For example, BT radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a BT device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, controller 124 may be configured to include and/or perform one or more functionalities and/or operations of a BT controller 169 of the BT device 102.

In some demonstrative aspects, one or more functionalities and/or operations of controller 124 may be implemented as part of a host processor of the BT device 102.

In other aspects, controller 124 may be implemented by one or more additional or alternative elements of device 102.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include circuitry and/or logic, e.g., processor circuitry and/or logic, memory circuitry and/or logic, MAC circuitry and/or logic, PHY circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of BT radio 114. For example, the chip or SoC may include one or more elements of controller 124, one or more elements of message processor 128, and/or one or more elements of BT radio 114. In one example, controller 124, message processor 128, and BT radio 114 may be implemented as part of the chip or SoC.

In other aspects, controller 124, message processor 128 and/or BT radio 114 may be implemented by one or more additional or alternative elements of device 102.

In some demonstrative aspects, for example, in some use cases, scenarios, deployments, and/or implementations, there may be a need to provide a technical solution to support improved, e.g., optimal, multipoint bandwidth allocation for BT communication to be performed by device 102 with a plurality BT devices, e.g., including BT devices 140, 160 and/or 180, e.g., as described below.

In some demonstrative aspects, controller 124 may be configured to perform the multipoint bandwidth allocation, for example, to allocate BT communication resources for communication between BT device 102 and a plurality of BT devices, e.g., devices 140, 160, and/or 180.

In some demonstrative aspects, controller 124 may be configured to perform the multipoint bandwidth allocation according to a multipoint bandwidth allocation mechanism, which may be configured to support bandwidth allocation to a plurality of different types of HID devices, which may have different requirements for bandwidth allocation, e.g., as described below.

For example, a keyboard device may have one or more first communication requirements, which may define one or more first bandwidth allocation requirements.

For example, a mouse device may have one or more second communication requirements, e.g., which may be different from the communication requirements of the keyboard device, and may define one or more second bandwidth allocation requirements e.g., which may be different from the bandwidth allocation requirements of the keyboard device.

For example, different HID devices, e.g., BT device 140 and BT device 160, may have different actual HID quality of service (QoS) requirements.

In one example, the actual HID QoS requirements of HID devices may differ, for example, based on the type of HID devices, e.g., a keyboard vs. a mouse.

In another example, there may be different types of mouse devices, which may have different requirements for bandwidth allocation.

For example, a first mouse device of a first mouse type may be capable of communicating multiple data packets per connection event. For example, the first mouse device may have a low latency QoS support for request of 2 data packets per connection event, e.g., using a More Data (MD) bit mechanism.

For example, a second mouse device of a second mouse type may not have the capability of the low latency QoS support for request of 2 data packets per connection event.

In some demonstrative aspects, controller 124 may be configured to determine a slot allocation setting for a BT link between device 102 and an HID device according to an HID-type-based slot allocation mechanism, which may be based on an HID type of the HID device, e.g., as described below.

In some demonstrative aspects, the HID-type-based slot allocation mechanism may be implemented by controller 124, for example, to provide a technical solution to support improved and/or efficient slot allocation for the BT link between device 102 and the HID device, e.g., as described below.

In some demonstrative aspects, the HID-type-based slot allocation mechanism may be implemented by controller 124, for example, to avoid a technical problem and/or an inefficiency of a bandwidth allocation assuming a worst-case of HID device requirements, e.g., as described below.

For example, setting up a BT link with an HID device according to a bandwidth allocation mechanism, which does not consider HID capabilities of the HID device, may result in one or more technical problems for communication over the BT link.

In one example, in case of setting up a BT link with a mouse device in a multipoint scenario, the BT link may suffer mouse latency issues, e.g., resulting from insufficient allocation of bandwidth at multipoint scenarios. For example, the mouse latency issues may lead to degraded user experience, e.g., in the form of cursor movement glitches and/or cursor jumps.

In some demonstrative aspects, controller 124 may be configured to set up a plurality of BT links for communication by device 102 in a multipoint scenario, where device 102 may communicate with a plurality of other BT devices, e.g., devices 140, 160 and/or 180.

In some demonstrative aspects, the multipoint scenario may include BT links having different communication requirements, e.g., as described below.

In some demonstrative aspects, controller 124 may be configured to set up a plurality of BT links for device 102 to communicate in a multipoint scenario including, for example, one or more HID links for communication with one or more HID devices, and/or one or more audio links, for example, for communication of a voice call.

In one example, controller 124 may be configured to set up an audio link for communication of a voice call between BT device 102 and BT device 180.

For example, the audio link may include an Extended Synchronous Connection Orientated (eSCO) link, or any other link.

For example, the eSCO link may require a 7.5 millisecond (ms) interval and 4 retransmission slots. These requirements for the eSCO link may result in a requirement for a reservation of 6 slots for the eSCO link every 12 slots, e.g., $7.5/0.625=12.0$, where each BT slot may have a duration of 0.625 ms.

For example, controller 124 may be configured to set up one or more LE HID links with one or more LE HID devices.

In one example, controller 124 may be configured to set up a first LE HID link with BT device 140, and/or a second LE HID link with BT device 160.

In some demonstrative aspects, HID devices of different HID types may have different QoS requirements, e.g., different latency requirements and/or any other requirements, which may result in different BT link requirements, for example, different connection intervals.

For example, a mouse device may require a 7.5 ms connection interval, for example, to meet latency requirements of the mouse device.

For example, a keyboard device may require a 15 ms connection interval, for example, to meet latency requirements of the keyboard device.

For example, some types of mouse devices may have a capability to utilize a more-data mechanism, for example, by setting in transmitted packets an MD bit, which may support sending two data packets per connection event.

For example, most or even all keyboard devices may not implement the capability of the MD bit. Accordingly, such keyboard devices may be configured to send only one data packet per connection event.

In some demonstrative aspects, in some use cases, scenarios, implementations, and/or deployments, there may be a need to solve one or more technical problems for setting up a BT connection between a BT device and an HID device, e.g., as described below.

In some demonstrative aspects, in some use cases, scenarios, implementations, and/or deployments, there may be one or more technical problems when implementing a BT controller to set up a BT link for communication with an HID device, for example, without the BT controller being able to differentiate between different types of the HID devices, e.g., as described below.

In some demonstrative aspects, in some use cases, scenarios, implementations, and/or deployments, there may be one or more technical problems when implementing a BT controller to set up a BT link for communication with an HID device, for example, without the BT controller being able to differentiate, e.g., at connection setup time, between a mouse device and keyboard device, e.g., as described below.

In some demonstrative aspects, in some use cases, scenarios, implementations, and/or deployments, there may be one or more technical problems when implementing a BT controller to set up a BT link for communication with an HID device, for example, without the BT controller being able to differentiate, e.g., at connection setup time, between a mouse device that has a capability of setting the MD bit and a mouse device that does not have the capability of setting the MD bit.

For example, a BT controller, which is not able to differentiate between different types of HID devices, may configure a bandwidth allocation for any HID device, for example, according to a worst case scenario, e.g., as described below.

For example, a BT controller, which is not able to differentiate between different types of HID devices, may configure a bandwidth allocation for any HID device as if the HID device is a mouse device that has the capability to set the MD bit, e.g., even if the HID device is actually not a mouse device and/or even if the HID device does not actually have the capability of using the MD bit.

In one example, setting the bandwidth allocation for the HID device according to the worst case scenario may result a bandwidth allocation including the reservation of 4 slots every 7.5 ms (12 slots), e.g., for a mouse device, for example, regardless whether the mouse device actually has the capability of using the MD bit.

In one example, setting the bandwidth allocation for the HID device according to the worst case scenario may result in a bandwidth allocation including reservation of 4 slots every 15 ms (24 slots), e.g., for a keyboard device.

For example, setting the bandwidth allocation for the HID device according to the worst case scenario may result in a requirement for an allocation of a large number of slots, for example, in a multipoint scenario.

In one example, setting the bandwidth allocation according to the worst case scenario may result in a requirement for an allocation of 14 slots every 12 slots, for example, in a multipoint scenario including an eSCO link, a keyboard link, and a mouse link, e.g., according to the following calculation:

$$\text{eSCO (6 slots)}+\text{Mouse (4 slots)}+\text{Keyboard (4 slots)}$$
$$\text{every 12 slots}=6+4+4=14 \text{ slots every 12 slots.}$$

According to this example, this requirement for 14 slots every interval of 12 slots may result in an overlap between two activities of two different links during at least two slots, e.g., every 12 slots. It is noted that, in some cases, the overlap between the activities may be during more than two slots, for example, in case the BT controller is not able to assume a role of a central device over one or more of the eSCO link, the keyboard link and/or the mouse link, for example, in order to utilize a clock dragging mechanism to align activities over the different links.

For example, the BT controller may implement a scheduling policy, which prioritizes audio quality. According to this example, the BT controller may ensure that there is no overlap between the eSCO slots and the slots allocated to the keyboard and the mouse, for example, to ensure good audio quality.

According to this example, setting the bandwidth allocation according to the worst case scenario may result in a situation where a slot allocation for one of the HID devices is arbitrarily reduced to 2 slots, for example, while the other HID device is still allocated with 4 slots.

According to this example, in case the BT controller is not able to differentiate between different types of HID devices, the BT controller may arbitrarily select to which HID device to allocate the full allocation of 4 slots, and to which HID device to allocate the reduced allocation of 2 slots. For example, the BT controller may allocate the reduced allocation of 2 slots based on the order in which the HID devices were connected.

In one example, according to a first scenario, a BT device may establish a first BT connection with an audio device, e.g., a headset; a second BT connection with a first HID device, e.g., a keyboard; and a third BT connection with a second HID device, e.g., a mouse. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 6 slots per 12-slot interval to the audio device, and an allocation of 4 slots per the 12-slot interval for the keyboard, for example, before connection of the mouse. This bandwidth allocation according to the worst case scenario may result in allocation of 6 slots per 12-slot interval to the audio device, an allocation of 2 slots per the 12-slot interval for the keyboard, and an allocation of 4 slots per the 12-slot interval to the mouse, for example, after connection of the mouse. This bandwidth allocation may have no substantial impact on performance and/or user experience, for example, as the keyboard may not use the MD bit mechanism, and, accordingly, may not require more than the 2 slots allocated to the keyboard.

In another example, according to a second scenario, a BT device may establish a first BT connection with an audio device, e.g., a headset; a second BT connection with a first HID device, e.g., a mouse; and a third BT connection with a second HID device, e.g., a keyboard. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 6 slots per 12-slot interval to the audio device, and an allocation of 4 slots per the 12-slot interval for the mouse, for example, before connection of the keyboard. This bandwidth allocation according to the worst case scenario may result in allocation of 6 slots per 12-slot interval to the audio device, an allocation of 2 slots per the 12-slot interval for the mouse, and an allocation of 4 slots per the 12-slot interval to the keyboard, for example, after connection of the keyboard. This bandwidth allocation may have impact on performance and/or user experience, for example, in terms of mouse latency issues, for example, in case the mouse sets the MD bit. For example, the bandwidth of 2 slots allocated for the mouse may not be enough to support the communication of two data packets per connection event.

In another example, according to a third scenario, a BT device may establish a first BT connection with a first HID device, e.g., a keyboard; a second BT connection with a second HID device, e.g., a mouse; and a third BT connection with an audio device, e.g., a headset. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 4 slots per 12-slot interval to the keyboard, and an allocation of 4 slots per the 12-slot interval for the mouse, for example, before connection of the audio device. This bandwidth allocation according to the worst case scenario may result in allocation of 4 slots per 12-slot interval to the keyboard, an allocation of 6 slots per the 12-slot interval to the audio device, and an allocation of 2 slots per the 12-slot interval for the mouse, for example, after connection of the audio device. This bandwidth allocation may have impact on performance and/or user experience, for example, in terms of mouse latency issues, for example, in case the mouse sets the MD bit. For example, the bandwidth of 2 slots allocated for the mouse may not be enough to support the communication of two data packets per connection event.

In another example, according to a fourth scenario, a BT device may establish a first BT connection with a first HID device, e.g., a keyboard; a second BT connection with an audio device, e.g., a headset; and a third BT connection with a second HID device, e.g., a mouse. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 4 slots per 12-slot interval to the keyboard, and an allocation of 6 slots per the 12-slot interval for the audio device, for example, before connection of the mouse. This bandwidth allocation according to the worst case scenario may result in allocation of 2 slots per 12-slot interval to the keyboard, an allocation of 6 slots per the 12-slot interval to the audio device, and an allocation of 2 slots per the 12-slot interval for the mouse, for example, after connection of the mouse. For example, the slots allocated to the link for the mouse may be placed next to the slots allocated to the link of the keyboard, e.g., using the 2 slots previously allocated to the keyboard link for the "secondary frame". This bandwidth allocation may have impact on performance and/or user experience, for example, in terms of mouse latency issues, for example, in case the mouse sets the MD bit. For example, the bandwidth of 2 slots allocated for the mouse may not be enough to support the communication of two data packets per connection event.

In another example, according to a fifth scenario, a BT device may establish a first BT connection with a first HID device, e.g., a mouse; a second BT connection with a second HID device, e.g., a keyboard; and a third BT connection with an audio device, e.g., a headset. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 4 slots per 12-slot interval to the mouse, and an allocation of 4 slots per the 12-slot interval for the keyboard, for example, before connection of the audio device. This bandwidth allocation according to the worst case scenario may result in allocation of 4 slots per 12-slot interval to the mouse, an allocation of 6 slots per the 12-slot interval to the audio device, and an allocation of 2 slots per the 12-slot interval for the keyboard, for example, after connection of the audio device. This bandwidth allocation may have no substantial impact on performance and/or user experience, for example, as the keyboard may not use the MD bit mechanism, and, accordingly, may not require more than the 2 slots allocated to the keyboard.

In another example, according to a sixth scenario, a BT device may establish a first BT connection with a first HID device, e.g., a mouse; a second BT connection with an audio device, e.g., a headset; and a third BT connection with a second HID device, e.g., a keyboard. According to this example, the BT device may set the bandwidth allocation for the audio device, the first HID device and the second HID device according to a worst case scenario, e.g., without differentiating between the types of the first and second HID devices. This bandwidth allocation according to the worst case scenario may result in allocation of 4 slots per 12-slot interval to the mouse, and an allocation of 6 slots per the 12-slot interval for the audio device, for example, before connection of the keyboard. This bandwidth allocation according to the worst case scenario may result in allocation of 2 slots per 12-slot interval to the mouse, an allocation of 6 slots per the 12-slot interval to the audio device, and an allocation of 2 slots per the 12-slot interval for the keyboard, for example, after connection of the keyboard. For example, the slots allocated to the link for the keyboard may be placed next to the slots allocated to the link of the mouse, e.g., using the 2 slots previously allocated to the mouse link for the "secondary frame". This bandwidth allocation may have impact on performance and/or user experience, for example, in terms of mouse latency issues, for example, in case the mouse sets the MD bit. For example, the bandwidth of 2 slots allocated for the mouse may not be enough to support the communication of two data packets per connection event.

The above examples show that for four out of the six scenarios, an implementation using the bandwidth allocation according to the worst case scenario may result in a technical issue, which may have impact on performance and/or user experience, for example, in terms of mouse latency issues. For example, in case the mouse sets the MD bit, the bandwidth of 2 slots allocated for the mouse may not be enough to support the communication of two data packets per connection event.

In some demonstrative aspects, controller 124 and/or BT controller 169 may be configured to determine a slot allocation setting for a BT link between device 102 and an HID device according to an HID-type-based slot allocation mechanism, which may be based on an HID type of the HID device, e.g., as described below.

In some demonstrative aspects, the HID-type-based slot allocation mechanism may be implemented by controller 124 and/or BT controller 169, for example, to provide a technical solution to support improved and/or efficient slot allocation for the BT link between device 102 and the HID device, e.g., as described below.

In some demonstrative aspects, the HID-type-based slot allocation mechanism may be implemented by controller 124 and/or BT controller 169, for example, to provide a technical solution to adapt and/or tailor bandwidth allocation, for example, according to an HID capability of an HID device, e.g., as described below.

In some demonstrative aspects, controller 124 and/or BT controller 169 may be configured to cause, trigger, instruct and/or control BT device 102 to identify an HID type of an HID, e.g., as described below.

In some demonstrative aspects, controller 124 and/or BT controller 169 may be configured to identify the HID type of the HID based, for example, on device discovery information from the HID, e.g., as described below.

In some demonstrative aspects, controller 124 and/or BT controller 169 may be configured to identify the HID type of the HID based, for example, on information from a host processor of the BT device 102, e.g., as described below.

In some demonstrative aspects, controller 124 and/or BT controller 169 may be configured to identify the device type of BT device 140, for example, based on device discovery data corresponding to the BT device 140.

In one example, controller 124 may be configured to identify the device type of BT device 140, for example, by "snooping" into the device discovery data corresponding to the BT device 140, e.g., as may be received in one or more messages from BT device 140.

In one example, controller 124 may be configured to identify the device type of BT device 140, for example, with assistance from host Software (SW) of the BT device 102. For example, the host SW of BT device 102 may inform the controller 124 about the device type of BT device 140, for example, after the host SW has identified the device type of BT device 140, e.g., from the device discovery data corresponding to the BT device 140.

In some demonstrative aspects, controller 124 and/or BT controller 169 may be configured to cause, trigger, instruct and/or control BT device 102 to configure a slot allocation setting of a BT link between the BT device 102 and the HID, for example, based on the HID type of the HID, e.g., as described below.

In some demonstrative aspects, the slot allocation setting of the BT link may include a setting of a count of transmission slots allocated to the HID during a schedule period.

In some demonstrative aspects, the schedule period may include 12 slots.

In other aspects, the schedule period may include any other number of slots.

In other aspects, the slot allocation setting of the BT link may include a setting of any other additional or alternative parameter and/or attribute of the slot allocation.

In some demonstrative aspects, controller 124 and/or BT controller 169 may be configured to cause, trigger, instruct and/or control BT device 102 to configure a schedule period including a first slot allocation for a first BT link with a first HID device of a first HID type, e.g., BT device 140, and a second slot allocation for a second BT link with a second HID device of a second HID type, different from the first HID type, e.g., BT device 160.

In some demonstrative aspects, the first slot allocation may include a first count of transmission slots, for example, based on the first HID type.

For example, controller 124 may configure the schedule period to include an allocation of a first count of transmission slots for the BT device 140, for example, based on an HID type of the BT device 140.

In some demonstrative aspects, the second slot allocation may include a second count of transmission slots based on the second HID type.

In some demonstrative aspects, the second count of transmission slots, which is allocated to the second BT device, may be different from the first count of transmission slots, which is allocated to the first BT device.

For example, controller 124 may configure the schedule period to include an allocation of a second count of transmission slots for the BT device 160, for example, based on an HID type of the BT device 160.

For example, the second count of transmission slots, which is allocated to the BT device 160, may be different from the first count of transmission slots, which is allocated to the BT device 140.

In one example, controller 124 may configure the schedule period to include an allocation of 4 slots per schedule period of 12 slots for a BT link with the BT device 140, for example, based on a determination that the BT device 140 is a mouse, which is capable of supporting the MD bit setting.

In another example, controller 124 may configure the schedule period to include an allocation of 2 slots per schedule period of 12 slots for a BT link with the BT device 160, for example, based on a determination that the BT device 160 is a keyboard.

In some demonstrative aspects, controller 124 may be configured to cause, trigger, instruct and/or control BT device 102 to configure a first slot allocation setting or a second slot allocation setting for a BT link with an HID device.

In some demonstrative aspects, the first slot allocation setting may be based on a determination that the HID device is a keyboard.

In some demonstrative aspects, the second slot allocation setting may be based on a determination that the HID is a mouse.

In some demonstrative aspects, the first slot allocation setting may include 2 slots allocated to the keyboard during a schedule period, e.g., per each 12-slot interval, or any other schedule period.

In one example, controller 124 may configure the schedule period including the first slot allocation setting for a BT link with the BT device 160, for example, based on a determination that the BT device 160 is a keyboard.

In some demonstrative aspects, the second slot allocation setting may include 2 slots or 4 slots allocated to the mouse during the schedule period, e.g., per each 12-slot interval, or any other schedule period.

In one example, controller 124 may configure the schedule period including the second slot allocation setting for a BT link with the BT device 160, for example, based on a determination that the BT device 160 is a mouse.

In some demonstrative aspects, controller 124 may be configured to cause, trigger, instruct and/or control BT device 102 to configure a first slot allocation setting or a second slot allocation setting for a BT link with an HID device, which is identified to be a mouse device.

In some demonstrative aspects, the first slot allocation setting may be based on a determination that the HID is a mouse of a first type.

In some demonstrative aspects, the second slot allocation setting may be based on a determination that the HID is a mouse of a second type.

In some demonstrative aspects, the first slot allocation setting may include 2 slots allocated to the mouse of the first type during a schedule period, e.g., per each 12-slot interval, or any other schedule period.

In some demonstrative aspects, the second slot allocation setting may include 4 slots allocated to the mouse of the second type during the schedule period, e.g., per each 12-slot interval, or any other schedule period.

In some demonstrative aspects, the mouse of the first type may include a mouse not having a capability to set a More Data (MD) bit in a BT packet transmitted by the mouse of the first type.

In one example, controller 124 may configure the schedule period including the first slot allocation setting, e.g., including 2 slots allocated to the mouse per each 12-slot interval, for a BT link with the BT device 140, for example, based on a determination that the BT device 140 is a mouse not having the capability to set the MD bit in a BT packet transmitted by BT device 140.

In some demonstrative aspects, the mouse of the second type may include a mouse having the capability to set the MD bit in a BT packet transmitted by the mouse of the second type.

In one example, controller 124 may configure the schedule period including the second slot allocation setting, e.g., including 4 slots allocated to the mouse per each 12-slot interval, for a BT link with the BT device 140, for example, based on a determination that the BT device 140 is a mouse having the capability to set the MD bit in a BT packet transmitted by BT device 140.

In some demonstrative aspects, controller 124 may identify that BT device 140 includes an HID device of a first HID type, e.g., a mouse having the capability to set the MD bit in a BT packet transmitted by BT device 140.

In some demonstrative aspects, for example, controller 124 may identify that BT device 140 includes the HID device of the first HID type, for example, based on discovery information received in one or more packets from the BT device 140, and/or based on information received by controller 124 from the host controller of BT device 102.

In some demonstrative aspects, controller 124 may identify that BT device 160 includes an HID device of a second HID type, e.g., a keyboard.

In some demonstrative aspects, for example, controller 124 may identify that BT device 160 includes the HID device of the second HID type, for example, based on discovery information received in one or more packets from the BT device 160, and/or based on information received by controller 124 from the host controller of BT device 102.

In some demonstrative aspects, controller 124 may be configured to determine a slot allocation setting for the BT device 140, e.g., when initiating a connection with the BT device 140.

For example, controller 124 may be configured to determine the slot allocation setting for the BT device 140 to include an allocation of 4 slots per 12-slot interval, for example, based on the determination that the BT device 140 includes the mouse having the capability to set the MD bit in the BT packet transmitted by BT device 140.

In some demonstrative aspects, controller 124 may be configured to determine a slot allocation setting for the BT device 160, e.g., when initiating a connection with the BT device 160.

For example, controller 124 may be configured to determine the slot allocation setting for the BT device 160 to include an allocation of 2 slots per 12-slot interval, for example, based on the determination that the BT device 160 includes the keyboard.

In some demonstrative aspects, the ability of controller 124 to determine the slot allocation setting for the BT device 140, e.g., based on the identified HID type of the BT device

140, and/or to determine the slot allocation setting for the BT device 160, e.g., based on the identified HID type of the BT device 160, may provide a technical solution to support efficient bandwidth allocation to the BT device 140, the BT device 160, and/or the BT device 180.

For example, the ability of controller 124 to determine the slot allocation setting for the BT device 140, e.g., based on the identified HID type of the BT device 140, and/or to determine the slot allocation setting for the BT device 160, e.g., based on the identified HID type of the BT device 160, may provide a technical solution to support controller 124 in allocating a 12-slot period to a mouse BT link with BT device 140, a keyboard BT link with BT device 160, and/or an eSCO BT link with BT device 180, e.g., as follows:

eSCO (6 slots)+Mouse (4 slots)+Keyboard (2 slots) every 12 slots=6+4+2=12 slots every 12 slots.

For example, the ability of controller 124 to determine the slot allocation setting for the BT device 140, e.g., based on the identified HID type of the BT device 140, and/or to determine the slot allocation setting for the BT device 160, e.g., based on the identified HID type of the BT device 160, may provide a technical solution to support controller 124 in allocating the 12-slot period, for example, while avoiding overlap between the slots allocated to the mouse BT link with BT device 140, the keyboard BT link with BT device 160, and the eSCO BT link with BT device 180.

For example, the ability of controller 124 to determine the slot allocation setting for the BT device 140, e.g., based on the identified HID type of the BT device 140, and/or to determine the slot allocation setting for the BT device 160, e.g., based on the identified HID type of the BT device 160, may provide a technical solution to support controller 124 in allocating the 12-slot period, for example, while avoiding mouse latency issues on the mouse BT link with BT device 140.

Reference is made to FIG. 2, which schematically illustrates a method of configuring a Bluetooth link for communication with an HID, in accordance with some demonstrative aspects. For example, one or more of the operations of the method of FIG. 2 may be performed by one or more elements of a system, e.g., system 100 (FIG. 1), for example, a BT device, e.g., BT device 102 (FIG. 1), and/or a controller, e.g., controller 124 (FIG. 1) and/or BT controller 169 (FIG. 1).

As indicated at block 202, the method may include identifying at a BT device an HID type of an HID. For example, controller 124 (FIG. 1) may be configured to identify an HID type of an HID implemented by BT device 140 (FIG. 1) and/or an HID type of an HID implemented by BT device 160 (FIG. 1), e.g., as described above.

As indicated at block 204, the method may include configuring a slot allocation setting of a BT link between the BT device and the HID, for example, based on the HID type of the HID. For example, controller 124 (FIG. 1) may be configured to configure a first slot allocation setting of a BT link between the BT device 102 (FIG. 1) and the HID implemented by BT device 140 (FIG. 1), for example, based on the HID type of the HID implemented by BT device 140 (FIG. 1); and/or to configure a second slot allocation setting of a BT link between the BT device 102 (FIG. 1) and the HID implemented by BT device 160 (FIG. 1), for example, based on the HID type of the HID implemented by BT device 160 (FIG. 1), e.g., as described above.

Figure 3:
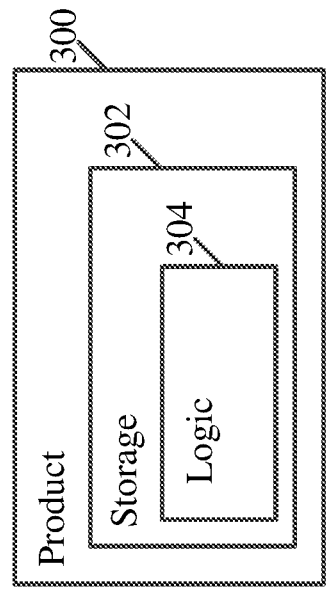
FIG. 3 is a schematic illustration of a product of manufacture, in accordance with some demonstrative aspects.

Reference is made to FIG. 3, which schematically illustrates a product of manufacture 300, in accordance with some demonstrative aspects. Product 300 may include one or more tangible computer-readable ("machine-readable") non-transitory storage media 302, which may include computer-executable instructions, e.g., implemented by logic 304, operable to, when executed by at least one computer processor, enable the at least one computer processor to implement one or more operations at device 102 (FIG. 1), controller 124 (FIG. 1), BT controller 169 (FIG. 1), and/or message processor 128 (FIG. 1); to cause device 102 (FIG. 1), controller 124 (FIG. 1), BT controller 169 (FIG. 1), and/or message processor 128 (FIG. 1) to perform, trigger and/or implement one or more operations and/or functionalities; and/or to perform, trigger and/or implement one or more operations and/or functionalities described with reference to the FIGS. 1 and/or 2, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 300 and/or machine-readable storage media 302 may include one or more types of computer-readable storage media capable of storing data, including volatile memory, non-volatile memory, removable or non-removable memory, erasable or non-erasable memory, writeable or re-writeable memory, and the like. For example, machine-readable storage media 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a Bluetooth (BT) device to identify a Human Interface Device (HID) type of an HID; and configure a slot allocation setting of a BT link between the BT device and the HID based on the HID type of the HID.

Example 2 includes the subject matter of Example 1, and optionally, wherein the slot allocation setting of the BT link comprises a setting of a count of transmission slots allocated to the HID during a schedule period.

Example 3 includes the subject matter of Example 2, and optionally, wherein the schedule period comprises 12 slots.

Example 4 includes the subject matter of any one of Examples 1-3, and optionally, wherein the apparatus is configured to cause the BT device to configure a schedule period comprising a first slot allocation for a first BT link with a first HID device of a first HID type and a second slot allocation for a second BT link with a second HID device of a second HID type, different from the first HID type, wherein the first slot allocation comprises a first count of transmission slots based on the first HID type, the second slot allocation comprises a second count of transmission slots based on the second HID type, the second count of transmission slots different from the first count of transmission slots.

Example 5 includes the subject matter of any one of Examples 1-4, and optionally, wherein the apparatus is configured to cause the BT device to configure a first slot allocation setting or a second slot allocation setting for the BT link, the first slot allocation setting based on a determination that the HID is a keyboard, the second slot allocation setting based on a determination that the HID is a mouse.

Example 6 includes the subject matter of Example 5, and optionally, wherein the first slot allocation setting comprises 2 slots allocated to the keyboard during a schedule period, and the second slot allocation setting comprises 2 slots or 4 slots allocated to the mouse during the schedule period.

Example 7 includes the subject matter of any one of Examples 1-6, and optionally, wherein the apparatus is configured to cause the BT device to configure a first slot allocation setting or a second slot allocation setting for the BT link, the first slot allocation setting based on a determination that the HID is a mouse of a first type, the second slot allocation setting based on a determination that the HID is a mouse of a second type.

Example 8 includes the subject matter of Example 7, and optionally, wherein the first slot allocation setting comprises 2 slots allocated to the mouse of the first type during a schedule period, the second slot allocation setting comprises 4 slots allocated to the mouse of the second type during the schedule period.

Example 9 includes the subject matter of Example 7 or 8, and optionally, wherein the mouse of the first type comprises a mouse not having a capability to set a More Data (MD) bit in a BT packet transmitted by the mouse of the first type, the mouse of the second type comprises a mouse having the capability to set the MD bit in a BT packet transmitted by the mouse of the second type.

Example 10 includes the subject matter of any one of Examples 1-9, and optionally, wherein the apparatus is configured to cause the BT device to identify the HID type of the HID based on device discovery information from the HID.

Example 11 includes the subject matter of any one of Examples 1-10, and optionally, wherein the apparatus is configured to cause the BT device to identify the HID type of the HID based on information from a host processor of the BT device.

Example 12 includes the subject matter of any one of Examples 1-11, and optionally, comprising a BT radio to communicate BT packets over the BT link.

Example 13 includes the subject matter of Example 12, and optionally, comprising one or more antennas connected to the BT radio, and a processor to execute instructions of an operating system of the BT device.

Example 14 comprises a wireless communication device comprising the apparatus of any one of Examples 1-13.

Example 15 comprises an apparatus comprising means for executing any of the described operations of Examples 1-13.

Example 16 comprises a product comprising one or more tangible computer-readable non-transitory storage media comprising computer-executable instructions operable to, when executed by at least one processor, enable the at least one processor to cause a device to perform any of the described operations of Examples 1-13.

Example 17 comprises an apparatus comprising: a memory interface; and processing circuitry configured to: perform any of the described operations of Examples 1-13.

Example 18 comprises a method comprising any of the described operations of Examples 1-13.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Bluetooth (BT) device to:
identify a particular Human Interface Device (HID) type of an HID from a plurality of predefined different HID types; and
configure a slot allocation setting of a BT link between the BT device and the HID based on the particular HID type of the HID, wherein the slot allocation setting of the BT link comprises a first slot allocation setting or a second slot allocation setting, based on a determination that the particular HID type is a first HID type or a second HID type, respectively, the second HID type different from the first HID type, wherein the first slot allocation setting comprises a first count of transmission slots allocated to the HID in a schedule period, the second slot allocation setting comprises a second count of transmission slots allocated to the HID in the schedule period, the second count of transmission slots different from the first count of transmission slots.

2. The apparatus of claim 1, wherein the first slot allocation setting comprises 2 transmission slots allocated to the HID in the schedule period, the second slot allocation setting comprises more than 2 transmission slots allocated to the HID in the schedule period.

3. The apparatus of claim 1, wherein the schedule period comprises 12 slots.

4. The apparatus of claim 1 configured to cause the BT device to configure the schedule period comprising a first link slot allocation for a first BT link with a first HID device of the first HID type and a second link slot allocation for a second BT link with a second HID device of the second HID type, wherein the first link slot allocation comprises the first count of transmission slots based on the first HID type, the second link slot allocation comprises the second count of transmission slots based on the second HID type.

5. The apparatus of claim 1, wherein the first slot allocation setting is based on a determination that the HID is a keyboard, the second slot allocation setting is based on a determination that the HID is a mouse.

6. The apparatus of claim 5, wherein the first slot allocation setting comprises 2 slots allocated to the keyboard during the schedule period, and the second slot allocation setting comprises 4 slots allocated to the mouse during the schedule period.

7. The apparatus of claim 1, wherein the first slot allocation setting is based on a determination that the HID is a mouse of a first type, the second slot allocation setting is based on a determination that the HID is a mouse of a second type.

8. The apparatus of claim 7, wherein the first slot allocation setting comprises 2 slots allocated to the mouse of the first type during the schedule period, the second slot allocation setting comprises 4 slots allocated to the mouse of the second type during the schedule period.

9. The apparatus of claim 7, wherein the mouse of the first type comprises a mouse not having a capability to set a More Data (MD) bit in a BT packet transmitted by the mouse of the first type, the mouse of the second type comprises a mouse having the capability to set the MD bit in a BT packet transmitted by the mouse of the second type.

10. The apparatus of claim 1 configured to cause the BT device to identify the particular HID type of the HID based on device discovery information from the HID.

11. The apparatus of claim 1 configured to cause the BT device to identify the particular HID type of the HID based on information from a host processor of the BT device.

12. The apparatus of claim 1, wherein the first HID type is a keyboard, the second HID type is a mouse, the second count of transmission slots is greater than the first count of transmission slots.

13. The apparatus of claim 1 comprising a BT controller to configure the slot allocation setting of the BT link, and a BT radio to communicate BT packets over the BT link.

14. The apparatus of claim 13 comprising one or more antennas connected to the BT radio, and a processor to execute instructions of an operating system of the BT device.

15. A product comprising one or more tangible computer-readable non-transitory storage media comprising computer-executable instructions operable to, when executed by at least one processor, enable the at least one processor to cause a Bluetooth (BT) device to:
identify a particular Human Interface Device (HID) type of an HID from a plurality of predefined different HID types; and
configure a slot allocation setting of a BT link between the BT device and the HID based on the particular HID type of the HID, wherein the instructions, when executed, cause the BT device to configure the slot allocation setting of the BT link comprising a first slot allocation setting or a second slot allocation setting, based on a determination that the particular HID type is a first HID type or a second HID type, respectively, the second HID type different from the first HID type, wherein the first slot allocation setting comprises a first count of transmission slots allocated to the HID in a schedule period, the second slot allocation setting comprises a second count of transmission slots allocated to the HID in the schedule period, the second count of transmission slots different from the first count of transmission slots.

16. The product of claim 15, wherein the first slot allocation setting comprises 2 transmission slots allocated to the HID in the schedule period, the second slot allocation setting comprises more than 2 transmission slots allocated to the HID in the schedule period.

17. The product of claim 15, wherein the instructions, when executed, cause the BT device to configure the schedule period comprising a first link slot allocation for a first BT link with a first HID device of the first HID type and a second link slot allocation for a second BT link with a second HID device of the second HID type, wherein the first link slot allocation comprises the first count of transmission slots based on the first HID type, the second link slot allocation comprises the second count of transmission slots based on the second HID type.

18. The product of claim 15, wherein the first slot allocation setting is based on a determination that the HID is a keyboard, the second slot allocation setting is based on a determination that the HID is a mouse.

19. The product of claim 15, wherein the first slot allocation setting is based on a determination that the HID is a mouse of a first type, the second slot allocation setting is based on a determination that the HID is a mouse of a second type.

20. The product of claim 19, wherein the mouse of the first type comprises a mouse not having a capability to set a More Data (MD) bit in a BT packet transmitted by the mouse of the first type, the mouse of the second type comprises a mouse having the capability to set the MD bit in a BT packet transmitted by the mouse of the second type.

21. The product of claim 15, wherein the instructions, when executed, cause the BT device to identify the particular HID type of the HID based on device discovery information from the HID.

22. The product of claim 15, wherein the instructions, when executed, cause the BT device to identify the particular HID type of the HID based on information from a host processor of the BT device.

23. An apparatus for a Bluetooth (BT) device, the apparatus comprising:

means for identifying a particular Human Interface Device (HID) type of an HID from a plurality of predefined different HID types; and means for causing the BT device to configure a slot allocation setting of a BT link between the BT device and the HID based on the particular HID type of the HID, wherein the slot allocation setting of the BT link comprises a first slot allocation setting or a second slot allocation setting, based on a determination that the particular HID type is a first HID type or a second HID type, respectively, the second HID type different from the first HID type, wherein the first slot allocation setting comprises a first count of transmission slots allocated to the HID in a schedule period, the second slot allocation setting comprises a second count of transmission slots allocated to the HID in the schedule period, the second count of transmission slots different from the first count of transmission slots.

24. The apparatus of claim 23, wherein the first slot allocation setting comprises a 2 transmission slots allocated to the HID in the schedule period, the second slot allocation setting comprises more than 2 transmission slots allocated to the HID in the schedule period.

* * * * *